(12) United States Patent
Hayasaka (10) Patent No.: US 12,300,037 B2
(45) Date of Patent: May 13, 2025

(54) DETERMINATION SYSTEM, DETERMINATION METHOD, COMPUTER PROGRAM, AND AUTHENTICATION SYSTEM

(71) Applicant: NEC Corporation, Tokyo (JP)

(72) Inventor: Akihiro Hayasaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 397 days.

(21) Appl. No.: 17/783,723

(22) PCT Filed: Dec. 16, 2019

(86) PCT No.: PCT/JP2019/049178
§ 371 (c)(1),
(2) Date: Jun. 9, 2022

(87) PCT Pub. No.: WO2021/124395
PCT Pub. Date: Jun. 24, 2021

(65) Prior Publication Data
US 2023/0005299 A1    Jan. 5, 2023

(51) Int. Cl.
*G06V 40/40* (2022.01)
*G06F 21/32* (2013.01)
(Continued)

(52) U.S. Cl.
CPC .............. *G06V 40/45* (2022.01); *G06F 21/32* (2013.01); *G06T 7/70* (2017.01); *G06V 40/161* (2022.01);
(Continued)

(58) Field of Classification Search
None
See application file for complete search history.

(56) References Cited

U.S. PATENT DOCUMENTS

2006/0093183 A1* 5/2006 Hosoi ................. G06V 40/166
382/103
2010/0134250 A1  6/2010 Chung et al.
(Continued)

FOREIGN PATENT DOCUMENTS

JP     2007-026330 A    2/2007
JP     2007-072861 A    3/2007
(Continued)

OTHER PUBLICATIONS

Indian Office Action for IN Application No. 202217034368 mailed on Nov. 4, 2022.
(Continued)

*Primary Examiner* — Dov Popovici (57) ABSTRACT

A determination system includes: a projection control unit that controls a projection unit to project a random marker within an angle of view of an imaging unit; an acquisition unit that obtains an image of a target person including the marker from the imaging unit; and a determination unit that determines whether or not the target person imaged by the imaging unit is a living body on the basis of a state of the marker included in the image. According to such a determination system, it is possible to accurately determine whether or not the target person is a living body. Therefore, for example, it is possible to avoid a breakthrough of biometric authentication by an illegal method, or the like.

10 Claims, 8 Drawing Sheets

(51) Int. Cl.
*G06T 7/70* (2017.01)
*G06V 40/16* (2022.01)

(52) U.S. Cl.
CPC .......... *G06T 2207/10016* (2013.01); *G06T 2207/30196* (2013.01); *G06T 2207/30204* (2013.01)

(56) References Cited

U.S. PATENT DOCUMENTS

| | | |
|---|---|---|
| 2016/0140405 A1 | 5/2016 | Graumann et al. |
| 2016/0358332 A1 | 12/2016 | Watanabe |
| 2017/0140211 A1* | 5/2017 | Hayasaka ............... G06T 19/20 |
| 2019/0050866 A1* | 2/2019 | Wang ............... G06Q 20/40145 |
| 2019/0251334 A1 | 8/2019 | Kawase |

FOREIGN PATENT DOCUMENTS

| | | |
|---|---|---|
| WO | 2004/072899 A1 | 8/2004 |
| WO | 2009/110323 A1 | 9/2009 |
| WO | 2018/079031 A1 | 5/2018 |
| WO | 2019/031531 A1 | 2/2019 |

OTHER PUBLICATIONS

JP Office Action for JP Application No. 2021 565167, mailed on Mar. 14, 2023 with English Translation.
Extended European Search Report for EP Application No. 19956374.3, dated on Nov. 14, 2022.
International Search Report for PCT Application No. PCT/JP2019/049178, mailed on Feb. 10, 2020.
SG Office Action for SG Application No. 11202250493E, issued on Oct. 4, 2024 with English Translation.

* cited by examiner

DETERMINATION SYSTEM, DETERMINATION METHOD, COMPUTER PROGRAM, AND AUTHENTICATION SYSTEM

This application is a National Stage Entry of PCT/JP2019/049178 filed on Dec. 16, 2019, the contents of all of which are incorporated herein by reference, in their entirety.

TECHNICAL FIELD

The present invention relates to a determination system, a determination method, a computer program, and an authentication system that make a determination related to a target person.

BACKGROUND ART

A known system of this type detects fraud when biometric authentication is performed. For example, Patent Literature 1 discloses a technique/technology of detecting spoofing by utilizing a difference between a biological distance and a non-biological distance. Patent Literature 2 discloses a technique/technology of detecting spoofing by comparing an image captured in a pupil of a subject with a particular image. Patent Literature 3 discloses a technique/technology of displaying a particular background image in an authentication place and of detecting spoofing by using brightness of a captured image.

CITATION LIST

Patent Literature

Patent Literature 1: International Publication No. WO2009/110323
Patent Literature 2: JP2007-072861A
Patent Literature 3: JP2007-026330A

SUMMARY

Technical Problem

The determination of spoofing uses various methods. In the techniques/technologies described in the respective Patent Literatures, however, an apparatus configuration and processing contents are complicated, or a determination accuracy becomes low depending on the circumstances, which are technically problematic.

The present invention has been made in view of the above problems, and it is an example object of the present invention to provide a determination system, a determination method, a computer program, and an authentication apparatus that are configured accurately determine whether or not a target person is a living body.

Solution to Problem

A determination system according to an example aspect of the present invention includes: a projection control unit that controls a projection unit to project a random marker within an angle of view of an imaging unit; an acquisition unit that obtains an image of a target person including the marker from the imaging unit; and a determination unit that determines whether or not the target person imaged by the imaging unit is a living body on the basis of a state of the marker included in the image.

A determination method according to an example aspect of the present invention includes: controlling a projection unit to project a random marker within an angle of view of an imaging unit; obtaining an image of a target person including the marker from the imaging unit; and determining whether or not the target person imaged by the imaging unit is a living body on the basis of a state of the marker included in the image.

A computer program according to an example aspect of the present invention operates a computer: to control a projection unit to project a random marker within an angle of view of an imaging unit; to obtain an image of a target person including the marker from the imaging unit; and to determine whether or not the target person imaged by the imaging unit is a living body on the basis of a state of the marker included in the image.

An authentication system according to an example aspect of the present invention includes: a projection control unit that controls a projection unit to project a random marker within an angle of view of an imaging unit; an acquisition unit that obtains an image of a target person including the marker from the imaging unit; a determination unit that determines whether or not the target person imaged by the imaging unit is a living body on the basis of a state of the marker included in the image; and an execution unit that performs an authentication process on the target person when it is determined that the target person is a living body.

Effect of the Invention

According to the determination system, the determination method, the computer program, and the authentication system in the respective aspects described above, it is possible to accurately determine whether or not a target person is a living body. This makes it possible to detect, for example, spoofing by a photograph or the like and to appropriately perform biometric authentication.

DESCRIPTION OF EXAMPLE EMBODIMENT

Hereinafter, a determination system, a determination method, a computer program, and an authentication system according to an example embodiment will be described with reference to the drawings.

<Determination System>

The determination system according to the example embodiment will be described with reference to FIG. 1 and FIG. 2.

(Functional Configuration)

Figure 1:
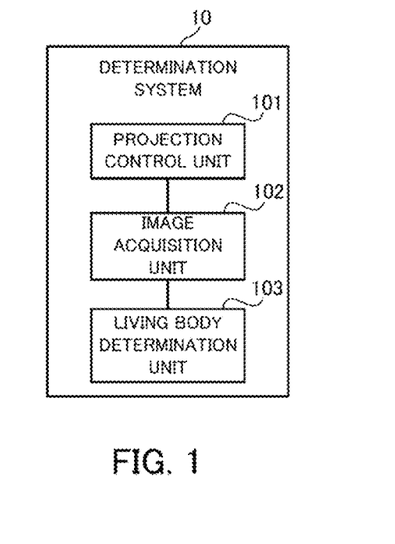
FIG. 1 is a block diagram illustrating a functional configuration of a determination system according to an example embodiment.

Referring first to FIG. 1, a functional configuration of the determination system according to the example embodiment will be described. FIG. 1 is a block diagram illustrating the functional configuration of the determination system according to the example embodiment.

In FIG. 1, a determination system 10 according to the example embodiment is configured as an apparatus for determining whether or not a target person of an authentication process (in other words, an imaging target of a face image) is a living body. The determination system 10 includes, as processing blocks for realizing its function, a projection control unit 101, an image acquisition unit 102, and a living body determination unit 103.

The projection control unit 101 is configured to control the operation of a projection unit that projects a marker (e.g., a projector 20 described later). The projection control unit 101 is allowed to control the projection unit to project a random marker so as to overlap a background of the target person or the target person. The projection control unit 101, for example, stores a plurality of types of markers in advance (specifically, markers with different colors, shapes, sizes, or the like) and selects one or more markers at random from among them to project. Alternatively, the projection control unit 101 may automatically generate and project a marker at each time.

The image acquisition unit 102 is configured to obtain an image of the target person for whom it is determined whether or not to be a living body. The image acquisition unit 102 obtains an image of the target person including the marker projected by the projection control unit 101. The image acquisition unit 102 may also be configured to obtain a plurality of temporally continuous images (in other words, a moving image). The image obtained by image acquisition unit 102 is configured to be outputted to the living body determination unit 103

The living body determination unit 103 determines whether or not the target person is a living body on the basis of the image obtained by the image acquisition unit 102. More specifically, the living body determining unit 103 determines whether the target person is actually in front of an imaging unit (e.g., a camera 30 described later) or "spoofing" by a photograph or the like is performed. The living body determination unit 103 determines whether or not the target person is a living body on the basis of a state of the marker included in the image of the target person (i.e., the marker projected by the projection control unit 101). A specific determination method in the living body determination unit 103 will be described in detail later. A result of the determination by the living body determining unit 103 is configured to be outputted to an external apparatus (e.g., an authentication apparatus 40 described later).

(Hardware Configuration)

Next, with reference to FIG. 2, a hardware configuration of the determination system 10 according to the example embodiment will be described. FIG. 2 is a block diagram illustrating the hardware configuration of the determination system according to the example embodiment.

Figure 2:
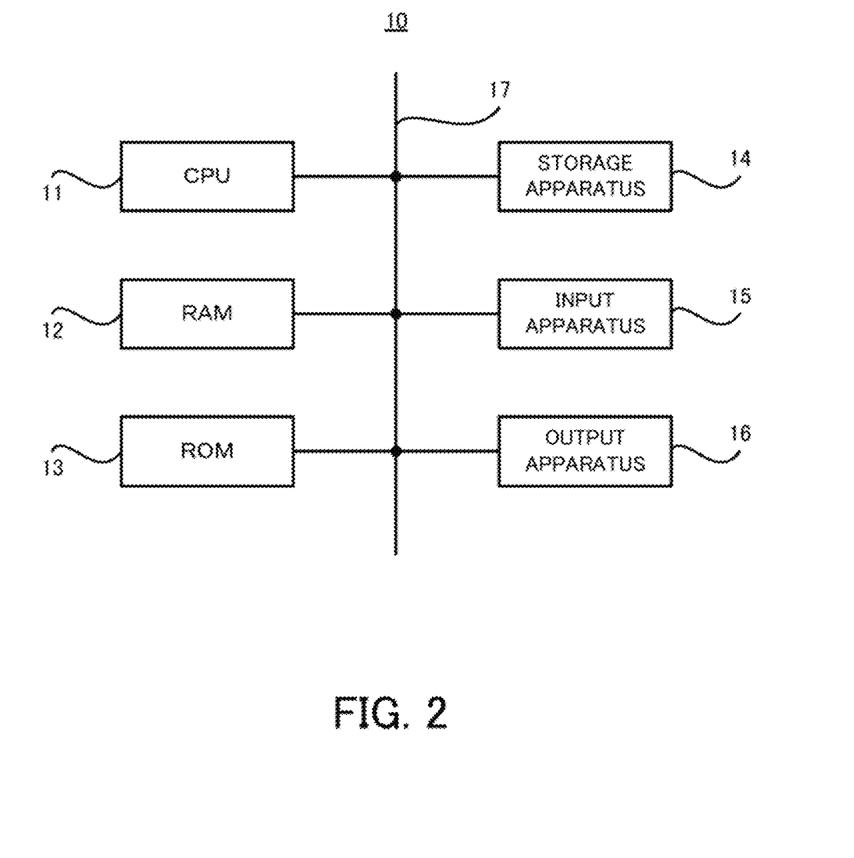
FIG. 2 is a block diagram illustrating a hardware configuration of a determination system according to the example embodiment.

As illustrated in FIG. 2, the determination system 10 according to the example embodiment includes a CPU (Central Processing Unit) 11, a RAM (Random Access Memory) 12, a ROM (Read Only Memory) 13, and a storage apparatus 14. The determination system 10 may further include an input apparatus 15 and an output apparatus 16. The CPU 11, the RAM 12, the ROM 13, the storage apparatus 14, the input apparatus 15, and the output apparatus 16 are connected through a data bus 17.

The CPU 11 reads a computer program. For example, the CPU 11 is configured to read a computer program stored in at least one of the RAM 12, the ROM 13 and the storage apparatus 14. Alternatively, the CPU 11 may read a computer program stored by a computer readable recording medium by using a not-illustrated recording medium reading apparatus. The CPU 11 may obtain (i.e., read) a computer program from a not-illustrated apparatus that is located outside the determination system 10 through a network interface. The CPU 11 controls the RAM 12, the storage apparatus 14, the input apparatus 15, and the output apparatus 16 by executing the read computer program. Especially in the example embodiment, when the CPU 11 executes the read computer program, a functional block for determining whether or not the target person is a living body is implemented in the CPU 11.

The RAM 12 temporarily stores the computer program to be executed by the CPU 11. The RAM 12 temporarily stores the data that is temporarily used by the CPU 11 when the CPU 11 executes the computer program. The RAM 12 may be, for example, a D-RAM (Dynamic RAM).

The ROM 13 stores the computer program to be executed by the CPU 11. The ROM 13 may otherwise store fixed data. The ROM 13 may be, for example, a P-ROM (Programmable ROM).

The storage apparatus 14 stores the data that is stored for a long term by the determination system 10. The storage apparatus 14 may operate as a temporary storage apparatus of the CPU 11. The storage apparatus 14 may include, for example, at least one of a hard disk apparatus, a magneto-optical disk apparatus, an SSD (Solid State Drive), and a disk array apparatus.

The input apparatus 15 is an apparatus that receives an input instruction from a user of the determination system 10. The input apparatus 15 may include, for example, at least one of a keyboard, a mouse, and a touch panel.

The output apparatus 16 is an apparatus that outputs information about the determination system 10 to the outside. For example, the output apparatus 16 may be a display apparatus (e.g., a display) that is configured to display the information about the determination system 10.

<Authentication System>

Next, an authentication system including the determination system 10 described above will be described with reference to FIG. 3 to FIG. 8.

(System Configuration)

Figure 3:
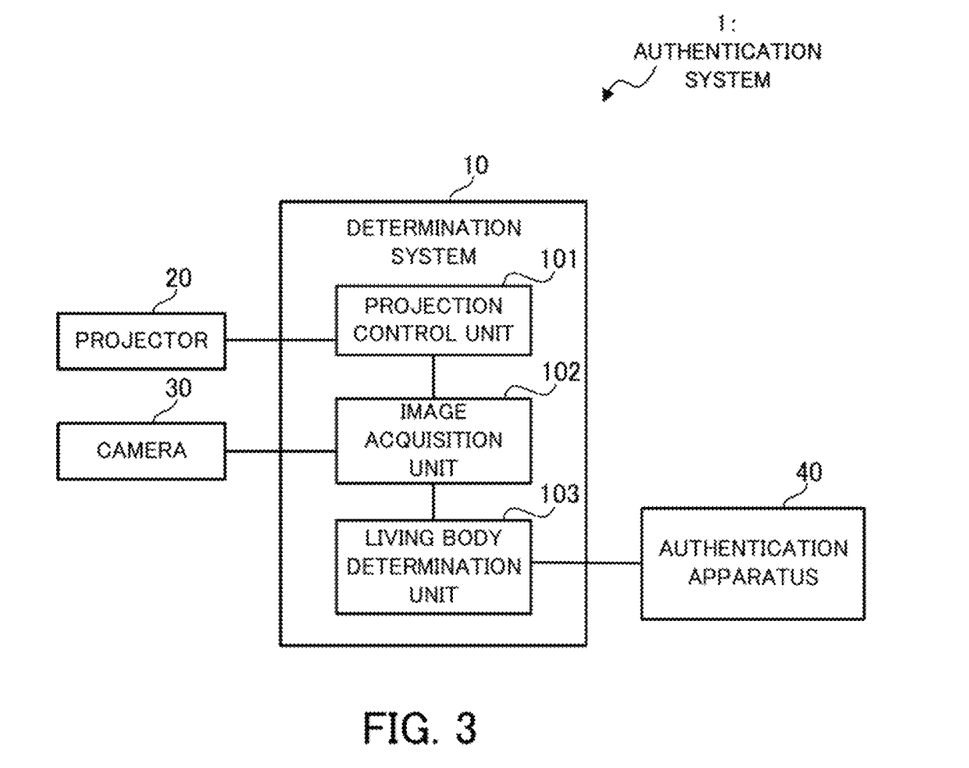
FIG. 3 is a block diagram illustrating an overall configuration of an authentication system according to the example embodiment.

First, with reference to FIG. 3, an overall configuration of the authentication system according to the example embodiment will be described. FIG. 3 is a block diagram illustrating the overall configuration of the authentication system according to the example embodiment.

In FIG. 3, an authentication system 1 according to the example embodiment is configured as a system for performing an authentication process that uses a face image of the target person (so-called face authentication). The authentication system 1 includes the determination system 10 described above, a projector 20, a camera 30, and an authentication apparatus 40.

The projector 20 is configured to project a random marker in accordance with an instruction of the projection control unit 101 in the determination system 10. The projector 20 is disposed in a position in which the marker can be projected within an angle of view of the camera 30. The projector 20 may project the marker with visible light or invisible light such as near infrared light.

The camera 30 is configured to capture an image of the target person of the authentication process (especially, an image around a face). Furthermore, the camera 30 is disposed in a position in which the marker projected from the projector 20 together with target person can be imaged. The image obtained by the camera 30 is configured to be outputted to the image acquisition unit 102 in the determination system 10. Incidentally, when the projector 20 projects the marker with invisible light, the camera 30 may be configured as a camera that is configured to image invisible light.

The authentication apparatus 40 performs face authentication of the target person on the basis of the image captured by the camera 30. In particular, the authentication apparatus 40 is configured to perform the authentication process on the basis of a determination result of the determination system 10 (i.e., whether the target person is a living body). The use of the determination result of the determination system 10 in the authentication apparatus 40 will be described in detail later. The authentication apparatus 40 may be configured to perform biometric authentication other than the face authentication (e.g., iris authentication, etc.) in place of the face authentication. A detailed description of specific contents of the authentication process performed by the authentication apparatus 40 will be omitted here because the existing techniques can be adapted. The authentication apparatus 40 may be configured, for example, as a cloud.

(Flow of Operation)

Figure 4:
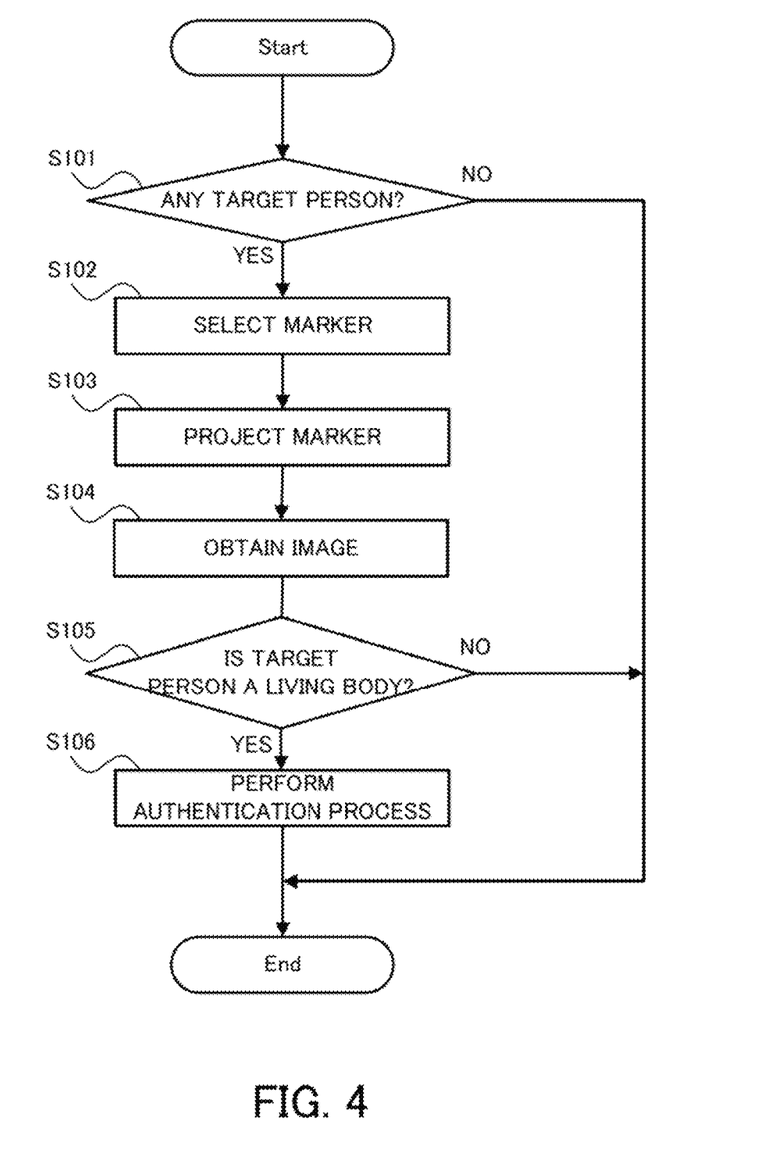
FIG. 4 is a flowchart illustrating a flow of operation of the authentication system according to the example embodiment.

Next, with reference to FIG. 4, a flow of operation of the authentication system 1 according to the example embodiment will be described. FIG. 4 is a flow chart illustrating the flow of the operation of the authentication system according to the example embodiment.

As illustrated in FIG. 4, the authentication system 1 according to the example embodiment firstly determines whether or not there is a target person of the authentication process (step S101). Whether or not there is a target person can be determined, for example, by detecting the presence of an object within the angle of view of a camera. The presence of the target person may be detected by the camera 30 or another not-illustrated sensor or the like. Alternatively, the presence of the target person may be detected when there is a terminal operated by the target person. When it is determined that there is no target person (the step S101: NO), the subsequent steps are omitted and a series of operation steps is ended. In this case, the step S101 may be restarted after a lapse of a predetermined period.

When it is determined that there is a target person (the step S101: YES), the projection control unit 101 randomly selects a marker to be projected (step S102). Then, the projection control unit 101 controls the projector 20 to project the selected marker. At this time, the projection control unit 101 may specify a projection position of the marker. Specifically, the projection control unit 101 may give an instruction to project the marker on the background of the target person (in other words, a position that does not overlap the target person), or give an instruction to project the marker at a position that allows at least a partial overlap of the target person. When projecting the marker to overlap the target person, however, it is preferable to project it while avoiding the position of eyes so as not to give a dazzling feeling to the target person, or to project it with invisible light. Furthermore, an instruction may be given to project a plurality of markers at different positions.

When the marker is projected, the image acquisition unit 102 obtains an image of the target person from the camera 30 (step S104). This image also includes the marker projected by the projector 20. When obtaining a moving image of the target person, the image acquisition unit 102 may continuously obtain images of the target person.

Subsequently, the living body determination unit 103 determines whether or not the target person is a living body on the basis of the image of the target person obtained by the image acquisition unit 102 (step S105). The living body determination unit 103 determines whether or not the target person is a living body, depending on whether or not the marker included in the image of the target person is captured in an expected state. Specifically, the living body determination unit 103 determines that the target person is a living body when the state of the marker included in the image of the target person is as expected, and determines that the target person is not a living body when it is not as expected. The living body determination unit 103 determines whether or not the state of the marker is as expected, for example, by using at least one of a position, an angle, and a size of the marker. The living body determination unit 103 may determine whether or not the target person is a living body, by using a parameter other than the position, the angle and the size of the marker (e.g., color and shape, etc.).

The living body determination unit 103, for example, projects the marker to a wall in a condition where there is no target person in advance, and stores a captured image at that time as a reference image. In this way, it is possible to determine whether or not the state of the marker is as expected by comparing the marker with the reference image. More specifically, the living body determination unit 103 is configured to determine whether or not the target person is a living body on the basis of a degree of matching of (at least one of) the position, the angle, the size between the marker included in the image obtained by imaging the target person and the marker in the reference image. The existing method may be adopted, as appropriate, to the derivation of the degree of matching, but common template matching or pattern matching in an imaging process, such as, for example, a SSD (Sum Of Squared Difference) and a SAD (Sum of Absolute Difference), may be used.

When it is determined that the target person is a living body (the step S105: YES), the authentication apparatus 40 performs the authentication process (in this example, face authentication that uses a face image) on the target person (step S106). Specifically, the authentication apparatus 40 extracts a face area from the image of the target person and determines whether or not the face of the target person matches a face registered in advance. Incidentally, the face authentication may use the image of the target person as it is, or may use a feature quantity (e.g., brightness, etc.) extracted from the image of the target person. When the authentication process is ended, the authentication apparatus 40 outputs a result (e.g., "authentication OK" or "authentication NG").

On the other hand, when it is determined that the target person is not a living body (the step S105: NO), the authentication apparatus 40 does not perform the face authentication (i.e., the step S106 is omitted). When the target person is not a living body, for example, "spoofing" by a photograph or the like is suspected. As a result of the authentication process being not performed, for example, it is possible to avoid an attack from a user who attempts to illegally break through the authentication process. When it determining that the target person is not a living body, the living body determination unit 103 may give a notice indicating that spoofing is performed. Specifically, the living body determining unit 103 may output a warning display or a warning sound to a system administrator or manager or the like.

(Specific Example of Operation)

Figure 5:
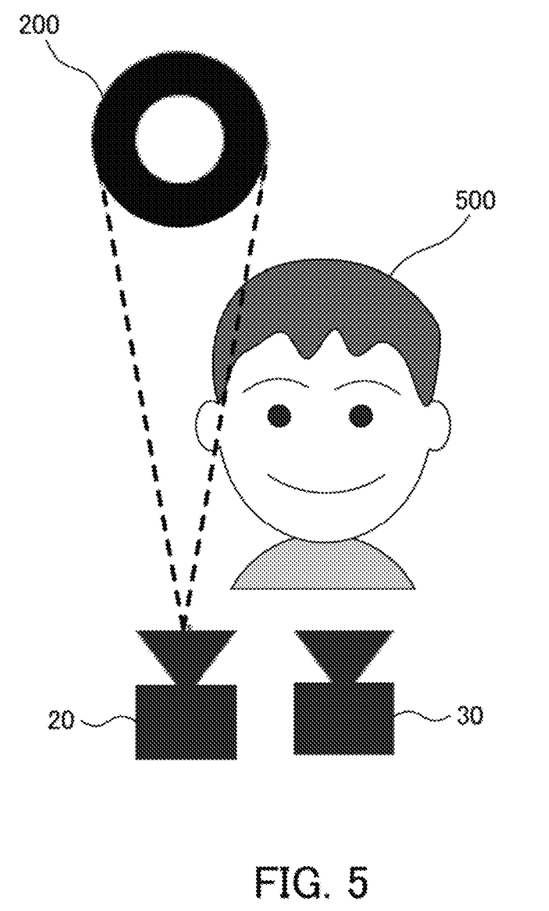
FIG. 5 is an image diagram illustrating an example of marker projection in normal times.
Figure 6:
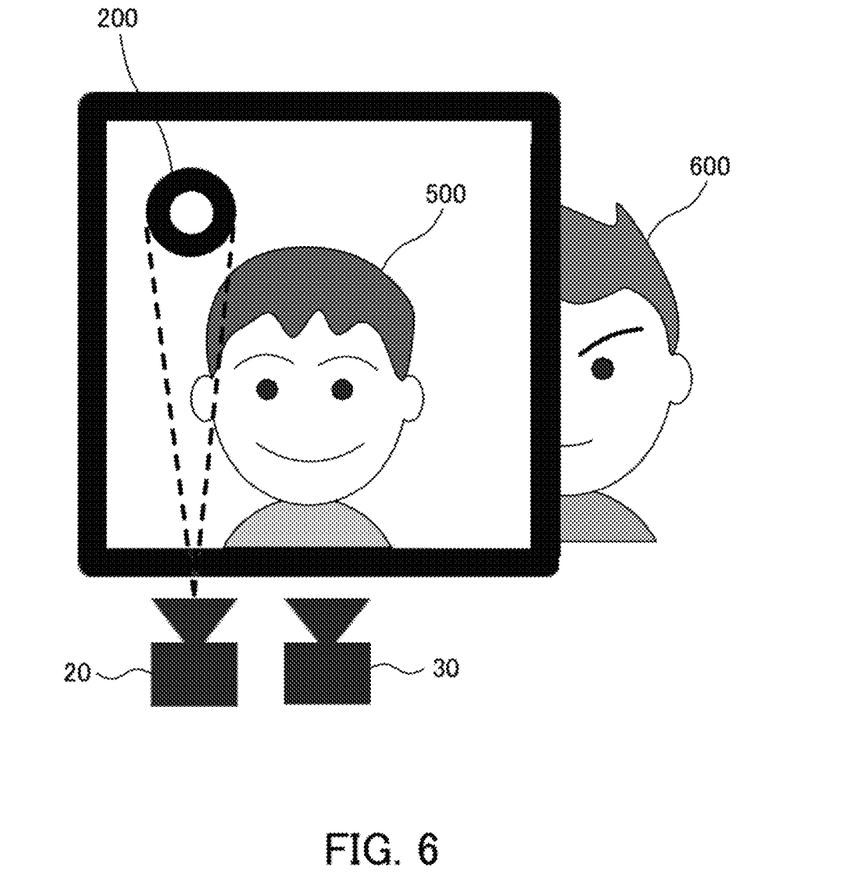
FIG. 6 is an image diagram illustrating an example of marker projection in attack.
Figure 7A:
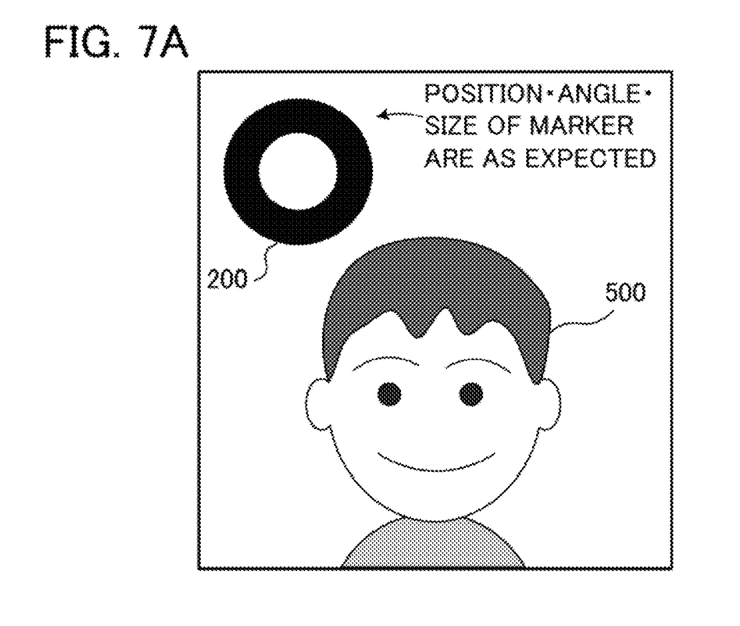
FIG. 7A and FIG. 7B are comparative diagrams illustrating a difference between a captured image in normal times and a captured image in attack.
Figure 7B:
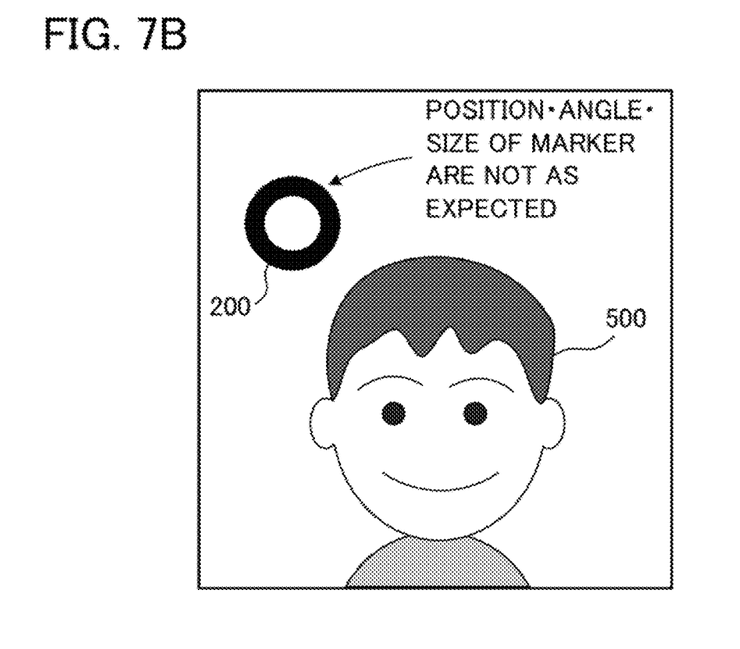

Next, with reference to FIG. 5 to FIG. 7B, a specific example of the operation of the authentication system 1 according to the example embodiment (especially, the determination system 10) will be described. FIG. 5 is an image diagram illustrating an example of marker projection in normal times. FIG. 6 is an image diagram illustrating an example of marker projection in attack. FIG. 7A and FIG. 7B are comparative diagrams illustrating a difference between a captured image in normal times and a captured image in attack.

As illustrated in FIG. 5, when a target person 500 is actually in front of the projector 20 and the camera 30 (in other words, when the target person 500 is a living body), a marker 200 projected from the projector 20 is projected on a background of the target person 500 (e.g., a wall behind the target person 500 or the like). In this case, since a position relationship between the projector 20 and the background is known in advance, it is possible to accurately predict in what state the marker is projected on the background. For example, by projecting the marker on the background (e.g., a wall or the like) in advance without a target person and storing a captured image at that time as a reference image, it is possible to know the position relationship between the projector 20 and the background in advance.

On the other hand, as illustrated in FIG. 6, when an attacker 600 points a photograph of the target person 500 at the camera 30 (in other words, when the target person 500 is not a living body), the marker 200 projected from the projector 20 is projected on the photograph of the target person 500. In this case, since the marker 200 is projected at a position closer than expected, for example, the size of the marker 200 is smaller than that expected.

As illustrated in FIG. 7A and FIG. 7B, when comparing the images of the target person 500 captured in the situations of FIG. 5 and FIG. 6 described above, there is a clear difference in how the marker 200 appears. Specifically, when the target person 500 is a living body, as illustrated in FIG. 7A, the marker 200 appears in the captured image in an expected state. On the other hand, when the target person 500 is not a living body, as in FIG. 7B, the marker 200 appears in the captured image in an unexpected state (specifically, a state in which the marker 200 is projected to be smaller than that in FIG. 7A). Thus, by analyzing how the marker 200 appears in the captured image, it is possible to accurately determine whether or not the target person 500 is a living body.

In the example described above, for convenience of description, the marker 200 is set to be a circle mark, but the shape of the marker is not particularly limited. For example, the marker 200 may include more complex patterns or may include characters or the like. Furthermore, a plurality of markers 200 may be projected on the background of the target person. In this case, when at least one marker 200 of the projected markers 200 appears in the captured image in an unexpected state, it may be determined that the target person 500 is not a living body.

MODIFIED EXAMPLE

Figure 8A:
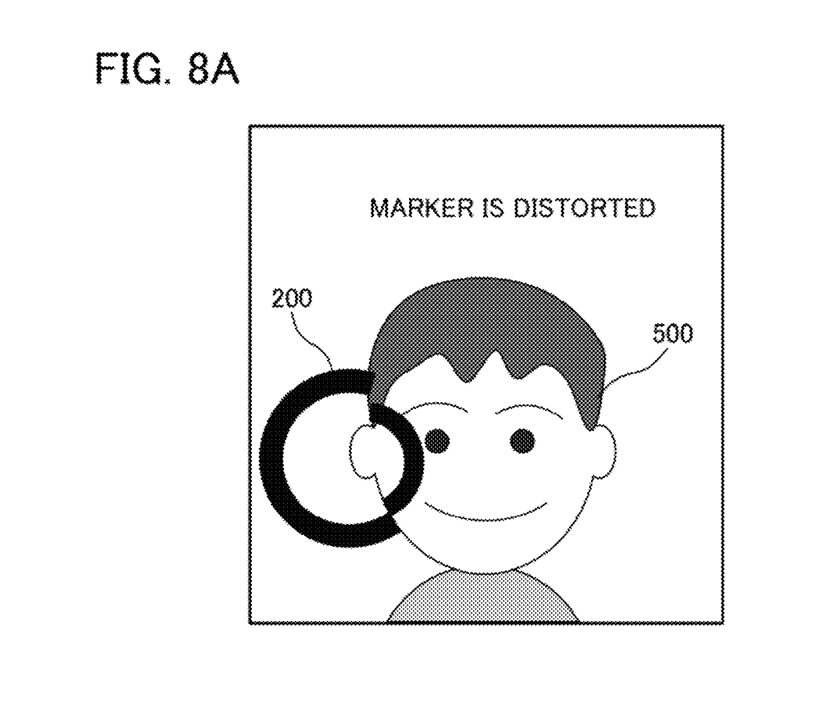
FIG. 8A and FIG. 8B are comparative diagrams illustrating an example of projecting a marker to overlap a target person.
Figure 8B:
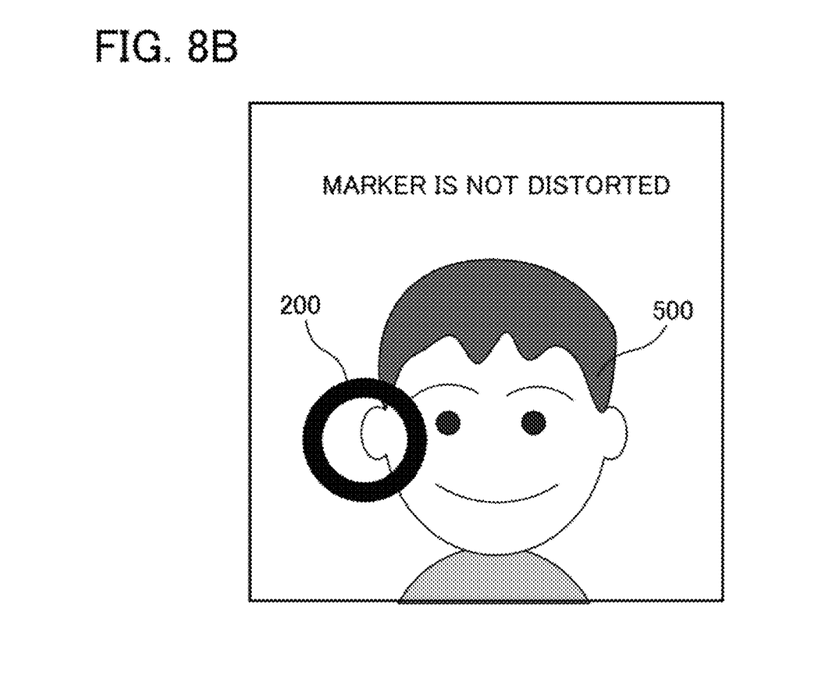

Next, with reference to FIG. 8A and FIG. 8B, a specific example of the operation of the authentication system 1 according to a modified example will be described. FIG. 8A and FIG. 8B are comparative diagrams illustrating an example of projecting the marker to overlap the target person.

As illustrated in FIG. 8A and FIG. 8B, the marker 200 may be projected to overlap the target person 500. Even in such a case, depending on whether or not the target person 500 is a living body, there is a clear difference in how the marker 200 appears in the captured image. Specifically, when the target person 500 is a living body, as in FIG. 8A, the marker 200 is distorted (or deviated) at a border part of the living body. Alternatively, even if the marker 200 is projected to overlap the target person 500 completely, the marker 200 is distorted to a greater or lesser extent due to the unevenness of the target person 500. On the other hand, when the target person 500 is not a living body (e.g., for a planar object such as a photograph), as in FIG. 8B, the marker 200 is not distorted. As descried above, by projecting the marker 200 to overlap the target person 500, it is possible to determine whether or not the target person 500 is a living body depending on whether or not the marker 200 is distorted in the captured image. Even when the marker 200 is distorted, if the distortion is unnatural, it may be determined that the target person 500 is not a living body.

Modified Example 2

The projector 20 (i.e., a projection unit that projects the marker 200) may be provided independently of the determination system 10. For example, the projector 20 may be configured to project the marker 200 manually (i.e., by an operation of an operator). In this way, it is possible to project the marker 200 at any timing of an operator. In this case, the determination system 10 may not include the projection control unit 101.

Modified Example 3

The projection of the marker 200 may be started without the target person 500. Specifically, it may be determined whether or not there is the target person 500 after the marker 200 is projected, and when there is the target person 500, the image of the target person 500 may be obtained. In this way, the target person 500 can view the position of the marker 200 in advance (i.e., the target person 500 can confirm the position of the marker 200 before being imaged by the camera 30). Therefore, the target person 500 can adjust his or her own position in accordance with the position of the marker 200. For example, the target person 500 can adjust a standing position such that the marker 200 does not overlap the eyes.

Technical Effect

Next, a technical effect obtained by the authentication system 1 according to the example embodiment will be described.

As described in FIG. 1 to FIG. 7B, in the authentication system 1 according to the example embodiment, when the authentication process is performed, the marker 200 is projected, and it is determined whether or not the target person 500 is a living body. Therefore, it is possible to avoid, for example, an attack by "spoofing" that uses a photograph or the like. By utilizing the marker 200 as in the example embodiment, it is possible to avoid illegal authentication breakthrough by a relatively simple apparatus configuration. Furthermore, since a special action is not required of the target person 500, a burden on the target person 500 is not increased in the authentication process.

<Supplementary Notes>

The example embodiment described above may be further described as, but not limited to, the following Supplementary Notes.

(Supplementary Note 1)

A determination system described in Supplementary Note 1 is a determination system including: a projection control unit that controls a projection unit to project a random marker within an angle of view of an imaging unit; an acquisition unit that obtains an image of a target person including the marker from the imaging unit; and a determination unit that determines whether or not the target person imaged by the imaging unit is a living body on the basis of a state of the marker included in the image.

(Supplementary Note 2)

A determination system described in Supplementary Note 2 is the determination system described in Supplementary Note 1, wherein the determination unit determines whether or not the target person imaged by the imaging unit is a living body on the basis of at least one of a position, an angle, and a size of the marker in the image.

(Supplementary Note 3)

A determination system described in Supplementary Note 3 is the determination system described in Supplementary Note 1 or 2, wherein the determination unit gives a notice indicating that spoofing is performed when it is determined that the target person imaged by the imaging unit is not a living body.

(Supplementary Note 4)

A determination system described in Supplementary Note 4 is the determination system described in any one of Supplementary Notes 1 to 3, wherein the projection control unit allows the marker to be projected in a background part of the target person.

(Supplementary Note 5)

A determination system described in Supplementary Note 5 is the determination system described in any one of Supplementary Notes 1 to 3, wherein the projection control unit allows the marker to be projected so as to at least partially overlap the target person.

(Supplementary Note 6)

A determination system described in Supplementary Note 6 is the determination system described in any one of Supplementary Notes 1 to 5, wherein the projection control unit allows the marker to be projected with invisible light.

(Supplementary Note 7)

A determination system described in Supplementary Note 7 is the determination system described in any one of Supplementary Notes 1 to 6, wherein the acquisition unit obtains a plurality of temporally continuous images from the imaging unit, and the determination unit determines whether or not the target person imaged by the imaging unit is a living body on the basis of a state of the marker included in the plurality of images.

(Supplementary Note 8)

A determination method described in Supplementary Note 8 is A determination method including: controlling a projection unit to project a random marker within an angle of view of an imaging unit; obtaining an image of a target person including the marker from the imaging unit; and determining whether or not the target person imaged by the imaging unit is a living body on the basis of the marker included in the image.

(Supplementary Note 9)

A computer program described in Supplementary Note 9 is A computer program that operates a computer: to control a projection unit to project a random marker within an angle of view of an imaging unit; to obtain an image of a target person including the marker from the imaging unit; and to determine whether or not the target person imaged by the imaging unit is a living body on the basis of a state of the marker included in the image.

(Supplementary Note 10)

An authentication system described in Supplementary Note 10 is an authentication system including: a projection control unit that controls a projection unit to project a random marker within an angle of view of an imaging unit; an acquisition unit that obtains an image of a target person including the marker from the imaging unit; a determination unit that determines whether or not the target person imaged by the imaging unit is a living body on the basis of a state of the marker included in the image; and an execution unit that performs an authentication process on the target person when it is determined that the target person is a living body.

The present invention is not limited to the examples described above and is allowed to be changed, if desired, without departing from the essence or spirit of the invention which can be read from the claims and the entire specification. A determination system, a determination method, a computer program, and an authentication system with such modifications are also intended to be within the technical scope of the present invention.

DESCRIPTION OF REFERENCE CODES

1 Authentication system
10 Determination system
20 Projector
30 Camera
40 Authentication apparatus
101 Projection control unit
102 Image acquisition unit
103 Living body determination unit
200 Marker
500 Target person
600 Attacker

What is claimed is:

1. A determination system comprising:
at least one memory storing instructions; and
at least one processor that is configured to execute the instructions to:
control a projection unit to project a random marker within an angle of view of an imaging unit;
obtain an image of a target person including the marker from the imaging unit; and
determine whether or not the target person imaged by the imaging unit is a living body on the basis of a state of the marker included in the image,
wherein the processor allows the marker to be projected from in front of the target person onto a background part in a position that does not overlap with the target person so that the marker does not overlap with the target person.

2. The determination system according to claim 1, wherein the processor determines whether or not the target person imaged by the imaging unit is a living body on the basis of at least one of a position, an angle, and a size of the marker in the image.

3. The determination system according to claim 1, wherein the processor gives a notice indicating that spoofing is performed when it is determined that the target person imaged by the imaging unit is not a living body.

4. The determination system according to claim 1, wherein the processor allows the marker to be projected with invisible light.

5. The determination system according to claim 1, wherein
the processor obtains a plurality of temporally continuous images from the imaging unit, and
the processor determines whether or not the target person imaged by the imaging unit is a living body on the basis of a state of the marker included in the plurality of images.

6. The determination system according to claim 1, wherein the processor determines whether or not the target person imaged by the imaging unit is a living body on the basis of at least one of a position, and a size of the marker in the image.

7. The determination system according to claim 1, wherein the processor determines whether the marker has an expected state based on a degree of match between the marker and a marker projected onto a wall under a condition where there is no target person, and determines whether or not the target person imaged by the imaging unit is a living body based on the determination.

8. The determination system according to claim 1, wherein the marker is projected in a condition where there is no target person, and
the processor obtains the image of the target person in a case where it is determined that the target person is present after the projection.

9. A determination method performed by a processor and comprising:
controlling a projection unit to project a random marker within an angle of view of an imaging unit;
obtaining an image of a target person including the marker from the imaging unit; and
determining whether or not the target person imaged by the imaging unit is a living body on the basis of a state of the marker included in the image,
wherein the processor allows the marker to be projected from in front of the target person onto a background part in position that does not overlap with the target person so that the marker does not overlap with the target person.

10. A non-transitory recording medium storing a computer program executable by a processor of a computer to perform a determination method comprising:
controlling a projection unit to project a random marker within an angle of view of an imaging unit;
obtaining an image of a target person including the marker from the imaging unit; and
determining whether or not the target person imaged by the imaging unit is a living body on the basis of a state of the marker included in the image,
wherein the processor allows the marker to be projected from in front of the target person onto a background part in position that does not overlap with the target person so that the marker does not overlap with the target person.

* * * * *